(12) United States Patent
Gillette et al.

(10) Patent No.: US 12,405,020 B2
(45) Date of Patent: Sep. 2, 2025

(54) HVAC CONNECTIVITY CONTROL SYSTEMS AND METHODS

(71) Applicant: Johnson Controls Tyco IP Holdings LLP, Milwaukee, WI (US)

(72) Inventors: Theresa Thy N. Gillette, Wichita, KS (US); Andrew Michael Boyd, Wichita, KS (US); D Gamage Methmini Umayangana Maheshwari Sumanasekara, Wichita, KS (US); Richard Jason Wilson, Milwaukee, WI (US); Shawn Curtis Matteson, Park City, KS (US); Mason Sloan DeWald, Wichita, KS (US); Anand Sureshrao Kalode, Pune (IN); Padmanabh Pandurang Gawai, Pune (IN); Pankaj Wasudeo Kharche, Pune (IN); Nikhil Gopal Ingale, Pune (IN); Ramesh Varma Venkata Naga Shiva Satya Bhupathiraju, Pune (IN)

(73) Assignee: TYCO FIRE & SECURITY GMBH, Neuhausen am Rheinfall (CH)

(*) Notice: Subject to any disclaimer, the term of this patent is extended or adjusted under 35 U.S.C. 154(b) by 516 days.

(21) Appl. No.: 17/834,726

(22) Filed: Jun. 7, 2022

(65) Prior Publication Data
US 2023/0392812 A1 Dec. 7, 2023

(51) Int. Cl.
*F24F 11/56* (2018.01)
*F24F 11/63* (2018.01)
*F24F 13/10* (2006.01)

(52) U.S. Cl.
CPC .............. *F24F 11/63* (2018.01); *F24F 11/56* (2018.01); *F24F 13/10* (2013.01)

(58) Field of Classification Search
CPC .............. F24F 11/56; F24F 11/63; F24F 13/10
See application file for complete search history.

(56) References Cited

U.S. PATENT DOCUMENTS

| | | | | |
|---|---|---|---|---|
| 2009/0312853 | A1* | 12/2009 | Kore | G05B 19/4185 700/90 |
| 2014/0324229 | A1* | 10/2014 | Leen | G05D 23/19 700/276 |
| 2017/0234562 | A1* | 8/2017 | Ribbich | F24F 11/86 700/277 |
| 2017/0356669 | A1* | 12/2017 | Gonia | F24F 11/58 |
| 2019/0203967 | A1* | 7/2019 | Grogg | H04Q 9/00 |
| 2019/0212025 | A1* | 7/2019 | Martin | F24F 11/49 |

(Continued)

*Primary Examiner* — Mark A Connolly
(74) *Attorney, Agent, or Firm* — Fletcher Yoder, P.C.

(57) ABSTRACT

A control system of a heating, ventilation, and/or air conditioning (HVAC) system includes a data communication controller configured to receive, via a first wireless communication protocol, data from a sensor indicative of an operational parameter of the HVAC system. The data communication controller is also configured to receive, via an electronic device communicatively coupled to the data communication controller, a control instruction, and to transmit, via a second wireless communication protocol different from the first wireless communication protocol, a control signal to adjust operation of an HVAC component configured to enable supply of conditioned air to a structure serviced by the HVAC system based on the data and the control instruction.

20 Claims, 8 Drawing Sheets

(56) References Cited

U.S. PATENT DOCUMENTS

| | | | |
|---|---|---|---|
| 2021/0033300 A1* | 2/2021 | Dong | F24F 11/80 |
| 2021/0318014 A1* | 10/2021 | Helbling | F24F 11/46 |
| 2022/0030955 A1* | 2/2022 | Kersey | H04W 76/12 |
| 2023/0108616 A1* | 4/2023 | Kielkowski | H04B 5/75 |
| | | | 455/41.1 |
| 2023/0314029 A1* | 10/2023 | Amer | F24F 11/56 |
| | | | 700/276 |

* cited by examiner

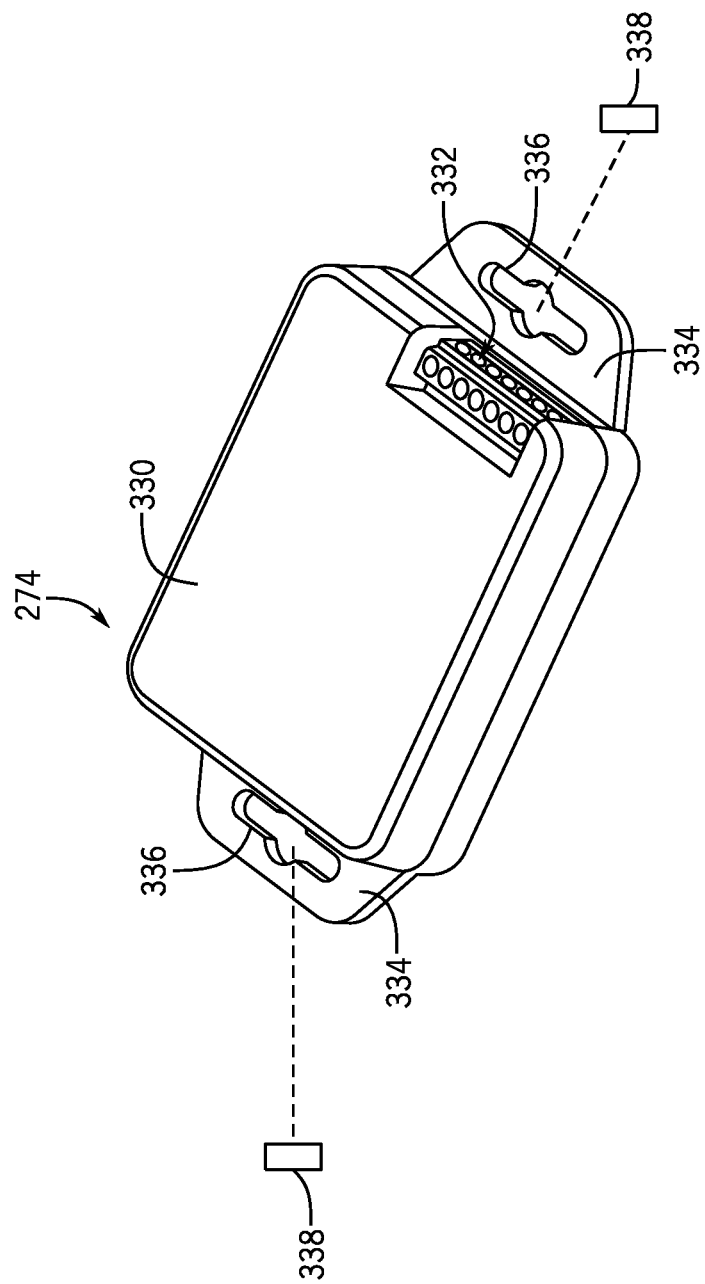

HVAC CONNECTIVITY CONTROL SYSTEMS AND METHODS

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A heating, ventilation, air conditioning, and/or refrigeration (HVAC) system may be used to control certain environmental conditions, such as temperature and/or humidity, within a building, home, storage space, or other suitable structure. For example, the HVAC system may include one or more heat exchangers, furnace systems, dehumidifiers, and/or other climate management components configured to facilitate regulation of the environmental parameters within a space to be conditioned. Moreover, the HVAC system may be a zoned HVAC system having controllable dampers that facilitate designation of customized temperature zones throughout the building. That is, the zoned HVAC system may operate to deliver suitably conditioned air to particular zones of the building in order to adequately meet and/or approach different demands for conditioned air in the zones. Typically, components of the HVAC system are communicatively coupled via wired connections to enable control of the components (e.g., via a controller). Unfortunately, installation of wired communication channels may be arduous, costly, and/or infeasible in accordance with conventional techniques.

SUMMARY

The present disclosure relates to a control system of a heating, ventilation, and/or air conditioning (HVAC) system. The control system includes a data communication controller configured to receive, via a first wireless communication protocol, data from a sensor indicative of an operational parameter of the HVAC system. The data communication controller is also configured to receive, via an electronic device communicatively coupled to the data communication controller, a control instruction, and to transmit, via a second wireless communication protocol different from the first wireless communication protocol, a control signal to adjust operation of an HVAC component configured to enable supply of conditioned air to a structure serviced by the HVAC system based on the data and the control instruction.

The present disclosure also relates to a control system of a heating, ventilation, and/or air conditioning (HVAC) system that includes a remote server configured to establish a cloud computing environment. The control system includes a data communication controller communicatively coupled to an electronic device via the cloud computing environment. The data communication controller is configured to receive a control instruction from the electronic device and receive, via a first wireless communication protocol, data from a first sensor indicative of a first operational parameter of the HVAC system. The data communication controller is also configured to receive, via a second wireless communication protocol, additional data from a second sensor indicative of a second operational parameter of the HVAC system. The control system also includes a climate management system including a control unit configured to receive the control instruction, the data, and the additional data from the data communication controller. The control unit is configured to modify operation of the climate management system to adjust a parameter of a conditioned air flow generated by the climate management system based on the control instruction, the data, and the additional data.

The present disclosure also relates to a control system for a heating, ventilation, and/or air conditioning (HVAC) system. The control system includes a data communication controller configured to receive sensor data from one or more sensors indicative of an operational parameter of the HVAC system and to output control instructions to one or more HVAC components using a plurality of different wireless communication protocols. The control system also includes a control unit of a climate management system, where the control unit is configured to receive the sensor data from the data communication controller, generate the control instructions based on the sensor data, and transmit the control instructions to the data communication controller for transmission to the one or more HVAC components.

BRIEF DESCRIPTION OF THE DRAWINGS

FIG. 8 is a perspective view of an embodiment of a dongle assembly of a control system for an HVAC system, in accordance with an aspect of the present disclosure.

DETAILED DESCRIPTION

Figure 1:
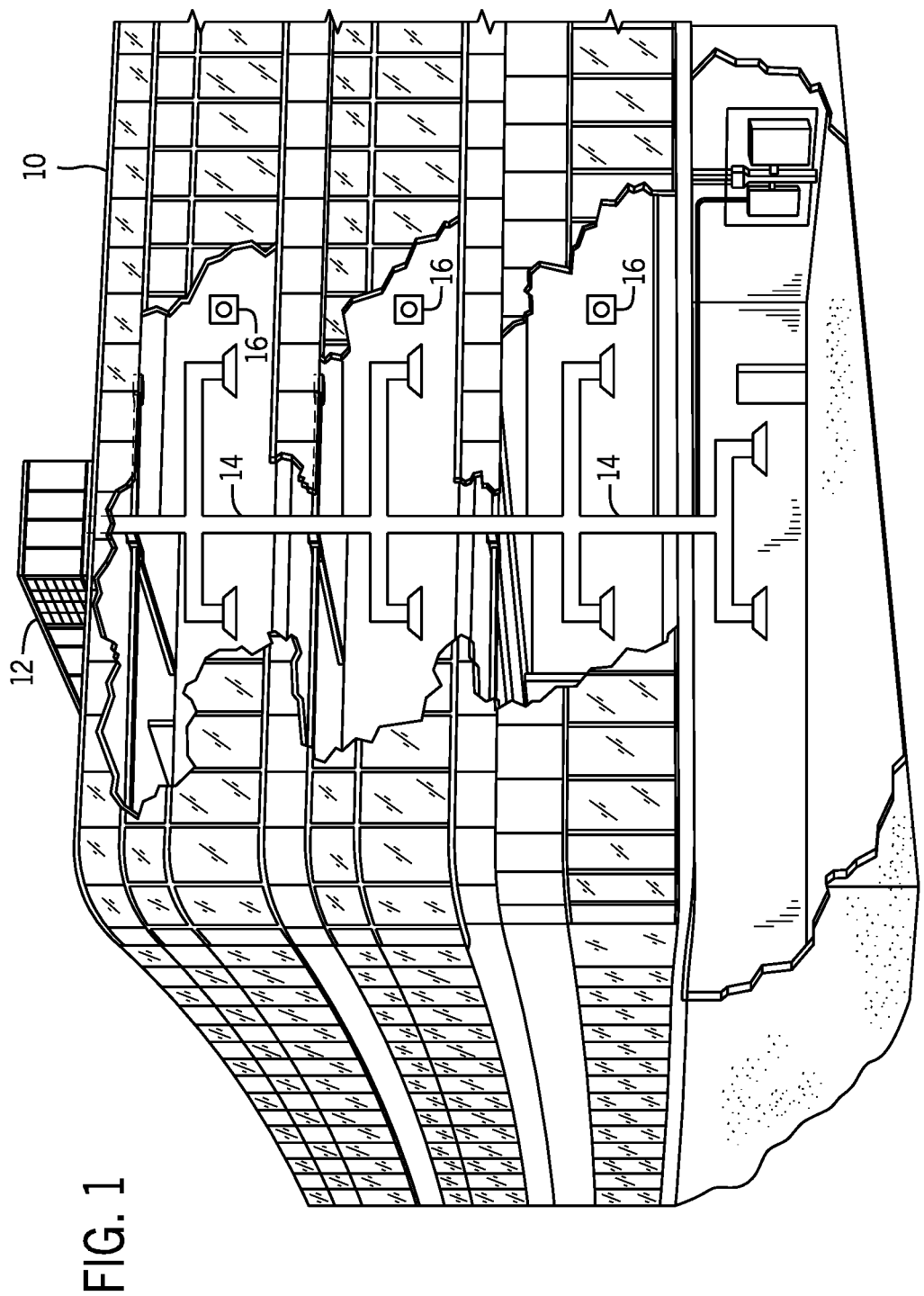
FIG. 1 is a perspective view of an embodiment of a building incorporating a heating, ventilation, and/or air conditioning (HVAC) system in a commercial setting, in accordance with an aspect of the present disclosure.

One or more specific embodiments of the present disclosure will be described below. These described embodiments are examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As briefly discussed above, a heating, ventilation, and/or air conditioning (HVAC) system may be used to regulate environmental parameters (e.g., temperature, humidity) within a space to be conditioned, such as a building, home, storage space, or other suitable structure. For example, the HVAC system may include a vapor compression system configured to transfer thermal energy between a working fluid, such as a refrigerant, and a fluid to be conditioned, such as air. The vapor compression system includes heat exchangers, such as a condenser and an evaporator, which are fluidly coupled to one another via one or more conduits of a refrigerant loop or circuit. A compressor may be used to circulate the refrigerant through the conduits and other components of the refrigerant circuit (e.g., an expansion device) and, thus, enable the transfer of thermal energy between components of the refrigerant circuit (e.g., between the condenser and the evaporator) and one or more thermal loads (e.g., an environmental air flow, a supply air flow).

Additionally or alternatively, the HVAC system may include a heat pump (e.g., a heat pump system) having a first heat exchanger (e.g., a heating and/or cooling coil, an indoor coil, an evaporator) that may be positioned within the space to be conditioned, a second heat exchanger (e.g., a heating and/or cooling coil, an outdoor coil, a condenser) that may be positioned in or otherwise fluidly coupled to an ambient environment (e.g., the atmosphere), and a pump (e.g., a compressor) configured to circulate the working fluid (e.g., refrigerant) between the first and second heat exchangers to enable heat transfer between the thermal load and the ambient environment, for example. The heat pump system may be operable in different modes to selectively provide cooling and heating to the space to be conditioned (e.g., a room, zone, or other region within a building) by adjusting a flow of the working fluid through the refrigerant circuit.

Moreover, certain HVAC systems may include zoned HVAC systems configured to concurrently regulate separate climate conditions within a plurality of separate spaces or rooms of a building or other structure. These previously designated spaces or rooms may form zones of the zoned HVAC system. Zoned HVAC systems often utilize a controller to control the operation of various air conditioning devices and/or equipment (e.g., one or more dampers) and enable the independent adjustment of climate parameters within each of the zones. For example, a zone controller of the HVAC system may be configured to adjust operation of devices of the HVAC system to adjust and/or maintain an air temperature within each zone at a desired setting or within a desired range. Accordingly, the zone controller enables the individual management of climate parameters within the zones. Further, the HVAC system may include a furnace system, a chiller system, and/or various other climate management components that may cooperate to regulate environmental parameters within a space to be conditioned.

Typically, HVAC components or equipment (e.g., temperature sensors, humidity sensors, dampers, controllers, motors) of the HVAC system are communicatively coupled to one another via wired connections that facilitate exchange of data and/or control signals between the HVAC components. Unfortunately, installation and/or repair of such wired communication channels may be arduous and time consuming and, thus, may increase costs and overall complexity involved in operating, maintaining, adjusting, or otherwise controlling the HVAC system. Further, due to limited communication functionality or accessibility of the HVAC components, it may be tedious to update or modify control software (e.g., control schemes, routines, or algorithms) that may be stored on memories of certain HVAC components. For example, once a control software update is available (e.g., from a service provider), updating the control software of the HVAC components may involve a human operator or technician physically traveling to a location of each of the HVAC components and manually installing software updates on the corresponding components (e.g., using a portable device, such as a universal serial bus [USB] drive, a laptop, or other memory device). Similarly, collection of diagnostic data, evaluation of fault conditions, and/or monitoring operation of the HVAC components may involve the human operator physically inspecting and/or interacting with the HVAC components by traveling to corresponding locations of the components. As a result, performing inspections, diagnosing and resolving potential fault conditions, updating HVAC system components, and so forth may be relatively time-consuming and, therefore, may cause a reduction in an overall operational efficiency of the HVAC system.

It is now recognized that utilizing a wireless control architecture to monitor, modify, and/or control components of the HVAC system may reduce costs and/or complexity involved in installation, operation, and/or maintenance of the HVAC system. As such, embodiments of the present disclosure are directed toward a control system (e.g., a wireless control system) that is configured to facilitate wireless communication between various components of the HVAC system, as well as to facilitate transmission and storage of data and control instructions via a cloud computing environment. For example, the control system may be communicatively coupled to one or more wireless sensors configured to provide the control system with feedback indicative of environmental parameters (e.g., temperature, humidity) within one or more spaces to be conditioned. The control system may utilize the feedback received from the sensors to generate instructions (e.g., control instructions) for adjusting operation of certain components of the HVAC system. In particular, the control system may transmit wireless control instructions to certain HVAC components to effectuate adjustment of the environmental parameters within the one or more spaces toward corresponding target set-point values for the environmental parameters. Indeed, the presently disclosed techniques may be utilized to enable improved adjustment to many HVAC system operations, modifications, maintenance procedures, and other adjustments. As discussed in detail herein, the control system may include communication components that enable seamless communication across a variety of different wireless communication protocols (e.g., Wi-Fi, mobile telecommunications technology, Bluetooth®, Zigbee®, Matter, near-field communications technology, Sub-1 gigahertz (GHz) communications technology, Li-Fi, Wi-Fi 802.11ah HaLow, and the like). In this manner, the control system may facilitate customizable configuration of the HVAC system by enabling exchange of data and/or control signals between various HVAC components that may utilize different wireless communication protocols, for example. As discussed herein, communication protocols may include, but are not limited to, THREAD, building automation and control network (BACnet) protocol, multiple spanning tree protocol (MSTP), BACnet IP protocol, and MODBUS RTU/IP protocol.

Embodiments of the control system disclosed herein may also enable a user (e.g., a service technician of the HVAC system, a tenant of a building in which the HVAC system is installed, another operator or user) to remotely adjust, inspect, or otherwise monitor operation of certain HVAC components included in the HVAC system. For example, components of the control system may be communicatively coupled (e.g., wirelessly coupled) to a cloud computing environment that is generated via a remote server of the control system. The cloud computing environment (e.g., a cloud network) is accessible by the user via a suitable electronic device (e.g., a smart phone, a laptop, a tablet). The control system may push indications indicative of operational parameters (e.g., real-time operational parameters), fault conditions, or other feedback received from HVAC components of the HVAC system to the cloud computing environment. The user may access the cloud computing environment via the electronic device to, for example, monitor operation of the HVAC components, diagnose potential causes of received fault conditions, clear fault conditions, and so forth. Moreover, the user may utilize the access provided by the cloud computing environment to remotely push or implement software updates to certain of the HVAC components that are communicatively coupled to the control system. In this manner, the control system enables the user to update, monitor, and/or otherwise adjust operation of the HVAC components from a remote location, without physically traveling to the respective locations of the HVAC components. To this end, the control system may reduce the complexity and/or time spent in operating and maintaining the HVAC system.

Embodiments of the present disclosure also relate to a dongle assembly that enables wireless control functionality to be provided to certain HVAC components that may not include integrated wireless communication components. That is, the dongle assembly may be a retro-fit component that is configured to provide wireless functionality to HVAC components that conventionally operate using wired communication channels and that may lack internal wireless communication circuitry. As such, the dongle assembly is operable to facilitate wireless communication between such HVAC components and the control system in accordance with the presently disclosed techniques. Additionally, the dongle assembly may be implemented in building management system (BMS) control architecture, home automation systems, fire detection, mitigation, and/or extinguishment systems, home surveillance systems, intrusion security systems, and/or other suitable applications. For example, the dongle assembly may include a connection port that enables communicative coupling (e.g., via a wired connection) of the dongle assembly to a local controller of an HVAC component (e.g., a component that lacks integrated wireless communication circuitry). The dongle assembly also includes wireless communication circuitry that enables the local controller to wirelessly communicate with the control system. That is, upon communicative coupling (e.g., wired coupling) with the local controller, the dongle assembly may operate as an intermediate controller that facilitates wireless communication between the local controller and the control system. Accordingly, the dongle assembly may facilitate wireless integration of certain HVAC components to the control system that would otherwise involve establishment of wired communication channels between the control system and such HVAC components. As discussed below, the dongle assembly (e.g., an individual dongle assembly) may be configured to provide wireless communication functionality to a single HVAC component or to a plurality of HVAC components. Moreover, the control system may be communicatively coupled (e.g., wirelessly coupled) to a plurality of dongle assemblies, where each of the dongle assemblies enables wireless communication functionality for one or more HVAC components. These and other features will be described below with reference to the drawings.

Turning now to the drawings, FIG. 1 illustrates an embodiment of a heating, ventilation, and/or air conditioning (HVAC) system for environmental management that employs one or more HVAC units in accordance with the present disclosure. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12 with a reheat system in accordance with present embodiments. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
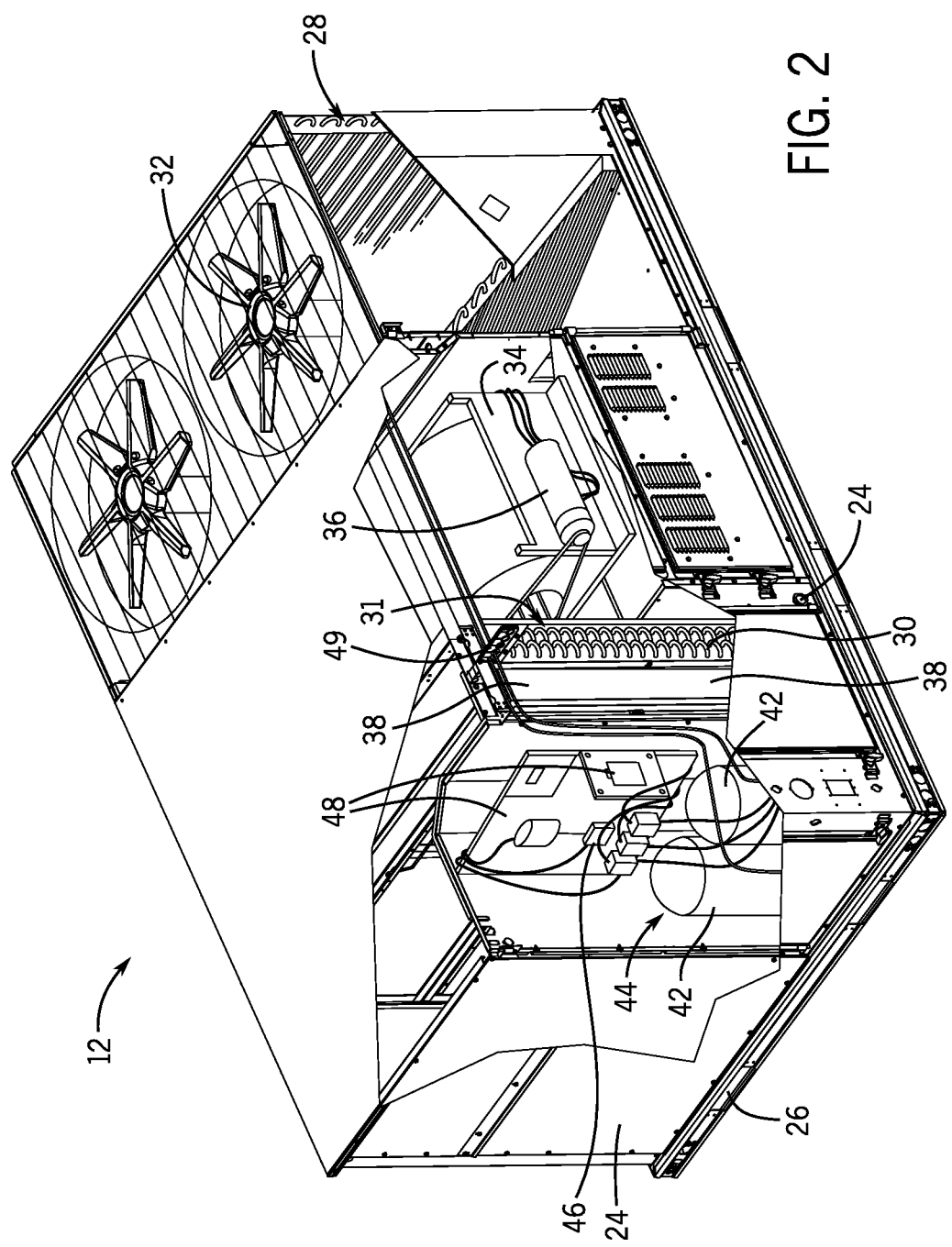
FIG. 2 is a perspective view of an embodiment of a packaged HVAC unit, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the HVAC unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
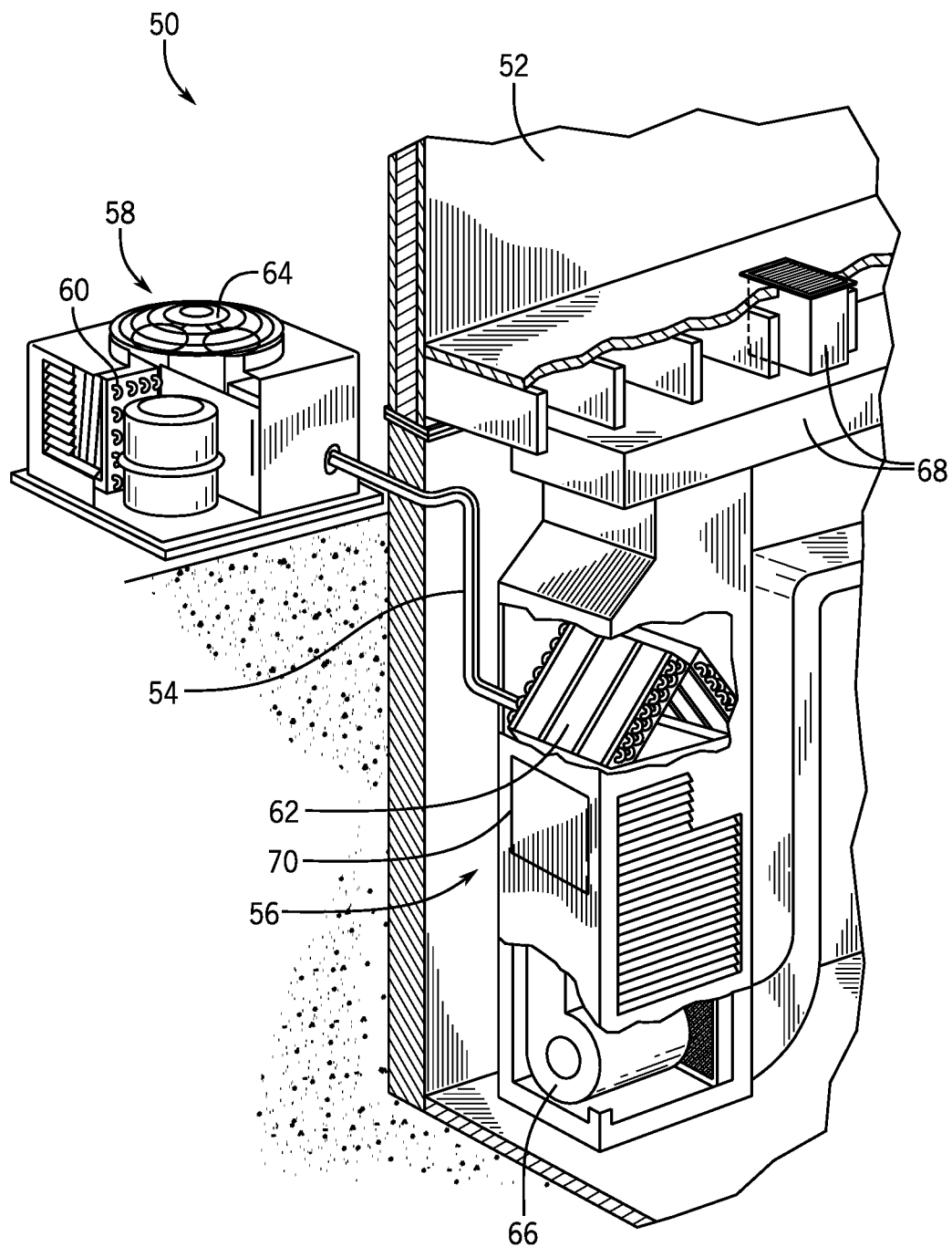
FIG. 3 is a perspective view of an embodiment of a split, residential HVAC system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily. The outdoor unit 58 includes a reheat system in accordance with present embodiments.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over the outdoor heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
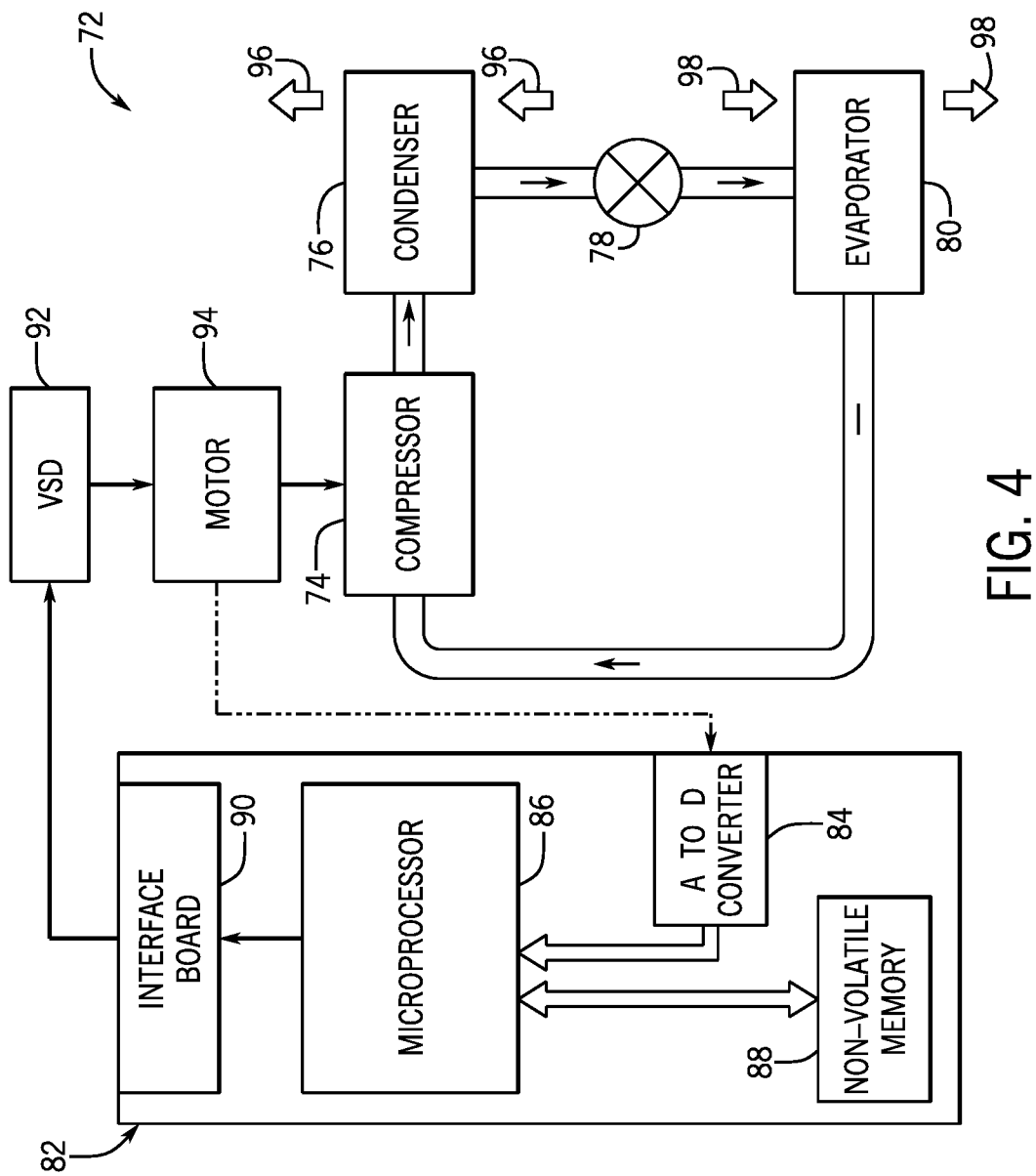
FIG. 4 is a schematic diagram of an embodiment of a vapor compression system used in an HVAC system, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil. In the illustrated embodiment, the reheat coil is represented as part of the evaporator 80. The reheat coil is positioned downstream of the evaporator heat exchanger relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

Figure 5:
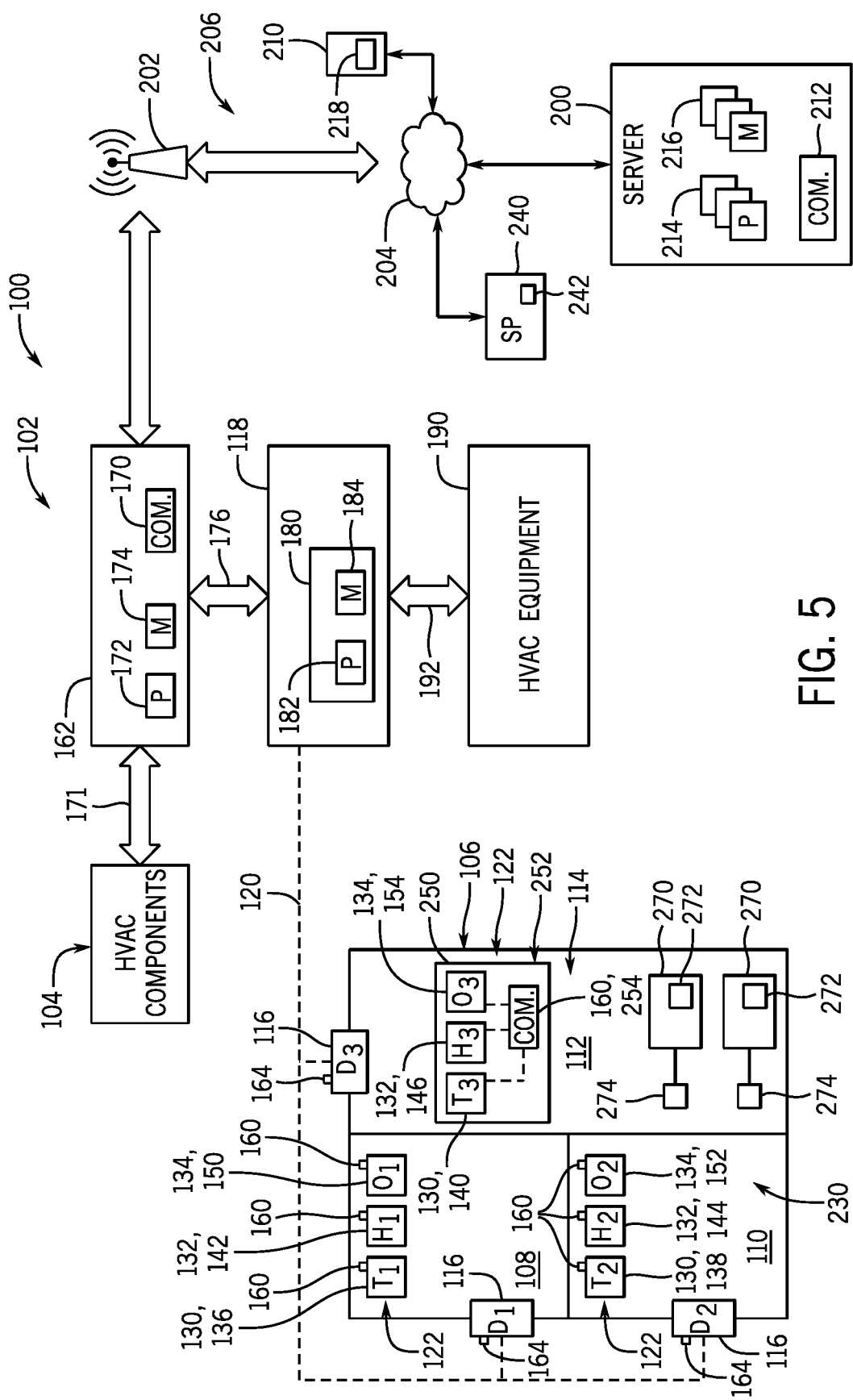
FIG. 5 is a schematic diagram of an embodiment of a portion of an HVAC system having a control system configured to enable wireless operation of HVAC components, in accordance with an aspect of the present disclosure.

As briefly discussed above, embodiments of the present disclosure are directed to a control system that enables improved wireless communication between HVAC components of an HVAC system. To provide context for the following discussion, FIG. 5 is a schematic of an embodiment of a portion of an HVAC system 100 that includes a control system 102 configured to facilitate wireless communication between various HVAC components 104 of the HVAC system 100. The HVAC system 100 may include one or more components of the HVAC unit 12, one or more components of the residential heating and cooling system 50, a chiller system, and/or another suitable HVAC system. Although the HVAC system 100 is described as servicing a building 106 (e.g., the building 10) throughout the following discussion, it should be understood that the HVAC system 100 may operate to control environmental parameters within any other suitable space or structure (e.g., one or more refrigeration cabinets).

In the illustrated embodiment, the building 106 includes a first zone 108, a second zone 110, and a third zone 112, which are collectively referred to herein as zones 114 of the HVAC system 100. The zones 114 may be associated with a respective room or space within the building 106. However, in other embodiments, each of the zones 114 may include 1, 2, 3, 4, 5, 6, or more than six rooms. Moreover, in certain embodiments, each of the rooms or spaces within the building 106 may be grouped into a single, common zone. The HVAC system 100 (e.g., zoned HVAC system) is configured to provide a supply of conditioned air to the building 106 to facilitate regulation of environmental parameters (e.g., operational parameters, such as temperature and/or humidity) within the zones 114. In embodiments where the HVAC system 100 is a zoned HVAC system, the HVAC system 100 may be configured to concurrently regulate (e.g., individually regulate) environmental parameters within each of the zones 114 of the building 106.

The HVAC components 104 may include one or more dampers 116 that are fluidly coupled to the zones 114 and to a climate management system 118 of the HVAC system 100 via a system of ductwork 120 (e.g., an air distribution system). The climate management system 118 is configured to provide a flow of conditioned air (e.g., cooled air, heated air, dehumidified air, filtered air) to the dampers 116 via the ductwork 120, such that the dampers 116 may direct the conditioned air into corresponding zones 114. The climate management system 118 may include an air handler having heat exchangers configured to condition air, a furnace system configured to output heated air (e.g., a two stage furnace, a modulating furnace system), and/or another suitable system configured to provide a conditioned air flow (e.g., a chiller system, a rooftop unit, a split HVAC system, and so forth). The control system 102 may be communicatively coupled to a plurality of sensors 122 disposed within the zones 114 and which may be considered elements of the HVAC components 104. The control system 102 may receive feedback from the sensors 122 and adjust supply of conditioned air from the climate management system 118 to the zones 114 based on the received sensor feedback (e.g., data). For example, the control system 102 may be communicatively coupled to the dampers 116 and may instruct the dampers 116 to increase or decrease a flow rate of conditioned air from the climate management system 118 to corresponding zones 114 (e.g., based on feedback or data received from the sensors 122) to cause environmental parameters within the zones 114 to approach corresponding target set-point values for the environmental parameters of each of the zones 114. As discussed in detail below, the control system 102 may be communicatively coupled to the sensors 122 and/or to the dampers 116 via suitable wireless communication protocols (e.g., wireless communication channels).

In some embodiments, the sensors 122 include a plurality of temperature sensors 130, a plurality of humidity sensors 132, and a plurality of occupancy sensors 134, which may be disposed within the zones 114 and be configured to provide corresponding feedback or data indicative of relative temperatures, humidities, and occupancies, respectively, within the zones 114. For example, the temperature sensors 130 may include a first temperature sensor 136, a second temperature sensor 138, and a third temperature sensor 140 configured to provide feedback indicative of temperatures within the first zone 108, the second zone 110, and the third zone 112, respectively. The humidity sensors 132 may include a first humidity sensor 142, a second humidity sensor 144, and a third humidity sensor 146 configured to provide feedback indicative of humidities within the first zone 108, the second zone 110, and the third zone 112, respectively. Further, the occupancy sensors 134 may include a first occupancy sensor 150, a second occupancy sensor 152, and a third occupancy sensor 154 configured to provide feedback indicative of occupancies within the first zone 108, the second zone 110, and the third zone 112, respectively. Additionally or alternatively, the sensors 122 may include any other suitable sensors configured to provide the control system 102 with feedback or data that may facilitate operation of the HVAC system 100.

In certain embodiments, each of the sensors 122 or a subset of the sensors 122 may include sensor communication circuitry 160 that enables wireless communication between the sensors 122 and a traffic controller 162 (e.g., a controller, communication traffic controller, a wireless controller, a data communication controller) of the control system 102. Similarly, each of the dampers 116 or a subset of the dampers 116 may include damper communication circuitry 164 that enables wireless communication between the dampers 116 and the traffic controller 162. That is, the sensor communication circuitry 160 and the damper communication circuitry 164 may provide wireless communication functionality in accordance with one or more suitable wireless communication protocols. In some embodiments, certain of the sensors 122 and/or certain of the dampers 116 may utilize wireless communication protocols that are different from the wireless communication protocols utilized by remaining sensors 122 and/or remaining dampers 116 of the HVAC system 100. As a non-limiting example, types wireless communication protocols may include Wi-Fi, mobile telecommunications technology, Bluetooth®, Zigbee®, Matter, near-field communications technology, and/or other suitable protocols. For example, in some embodiments, a first group of the sensors 122 (e.g., one or more of the temperature sensors 130) may utilize a first type of wireless communication protocol (e.g., Matter) and a second group of the sensors 122 (e.g., one or more of the humidity sensors 132) may utilize a second type of wireless communication protocol (e.g. Bluetooth®) that is different than the first type of wireless communication protocol. Moreover, the dampers 116 (or a subset of the dampers 116) may utilize a third type of wireless communication protocol (e.g., Zigbee®) that may be different than the first type of wireless communication protocol and the second type of wireless communication protocol. Indeed, it should be understood that individual HVAC components 104 and/or groups of the HVAC components 104 within the HVAC system 100 may operate using various different wireless communication protocols.

The traffic controller 162 includes a communication interface 170 (e.g., a multi-protocol communication interface 170) that is configured to communicate with the HVAC components 104 via a variety of different wireless communication protocols 171. That is, the communication interface 170 enables the traffic controller 162 to, for example, receive feedback from the first group of sensors 122 via the first type of wireless communication protocol, receive feedback from the second group of sensors 122 via the second type of wireless communication protocol, send and/or receive control instructions from the dampers 116 using the third type of wireless communication protocol, and so forth. In this manner, HVAC components 104 utilizing different wireless communication protocols may be implemented in the HVAC system 100 with one another, and the traffic controller 162 may facilitate seamless integration of the HVAC components 104 with the control system 102 to enable desired operation and configurability of the HVAC system 100. For example, the traffic controller 162 may facilitate installation and/or maintenance of the HVAC system 100 by enabling improved replacement or upgrading of the HVAC components 104 that use different wireless communication protocols. In some embodiments, the communication interface 170 may operate as a transparent protocol converter, such as a MODBUS to BACnet converter and/or a BACnet to MODBUS converter, for example.

The traffic controller 162 includes processing circuitry 172 (e.g., one or more processors) and a memory device 174 (e.g., one or more memory devices). The processing circuitry 172 may include one or more microprocessors, which may execute software for analyzing feedback or data received from the sensors 122, controlling the dampers 116, and monitoring and/or controlling operation of other HVAC components 104 of the HVAC system 100. The processing circuitry 172 may include multiple microprocessors, one or more "general-purpose" microprocessors, one or more special-purpose microprocessors, and/or one or more application specific integrated circuits (ASICS), or some combination thereof. For example, the processing circuitry 172 may include one or more reduced instruction set (RISC) processors. The memory device 174 may include volatile memory, such as random access memory (RAM), and/or nonvolatile memory, such as read-only memory (ROM). The memory device 174 may store information, such as control software (e.g., compressor control algorithms or schemes), look up tables, configuration data, communication protocols, etc.

For example, the memory device 174 may store processor-executable instructions including firmware or software for the processing circuitry 172 to execute, such as instructions for controlling any of the aforementioned components of the HVAC system 100 and/or other components of HVAC system 100 via suitable wireless communication protocols. In some embodiments, the memory device 174 is a tangible, non-transitory, machine-readable media that may store machine-readable instructions for the processing circuitry 172 to execute. The memory device 174 may include ROM, flash memory, hard drives, any other suitable optical, magnetic, or solid-state storage media, or a combination thereof. The communication interface 170 enables the processing circuitry 172 to communicate with the HVAC components 104 and/or other components of the HVAC system 100 using multiple different wireless communication protocols.

In some embodiments, the traffic controller 162 is communicatively coupled (e.g., via one or more wired connections, such as a bi-directional RS-485 connection, a 4 pin RS-485 connection) to the climate management system 118 via communication channel 176. The traffic controller 162 may be integrated with the climate management system 118 or include a component that is separate from the climate management system 118. The traffic controller 162 may receive feedback or data from the sensors 122 via one more of the aforementioned wireless communication protocols 171 and transmit the sensor feedback or data to a control unit 180 (e.g., having processing circuitry 182 and memory device 184) of the climate management system 118 via the communication channel 176 (e.g., using RS-485 communication protocol). In some embodiments, the traffic controller 162 may send raw (e.g., unprocessed) sensor feedback or data and/or pre-processed sensor feedback or data to the control unit 180. The control unit 180 may analyze the sensor feedback or data and generate control instructions for operating the climate management system 118 and/or certain of the HVAC components 104 based on the sensor feedback or data.

For example, upon receiving sensor feedback or data collected by the traffic controller 162 from the sensors 122, the control unit 180 may determine whether operation of the dampers 116 and/or other HVAC components 104 is to be adjusted to achieve a target temperature and/or a humidity setpoint within the zones 114. The control unit 180 may generate control instructions for adjusting operation of one or more of the HVAC components 104 based on the received sensor feedback and may transmit the control instructions to the traffic controller 162 via the communication channel 176. As such, based on the type of HVAC component 104 for which the control unit 180 generates the control instructions, the traffic controller 162 may convert (e.g., via the communication interface 170) the control instructions to a suitable format for wireless transmission to the HVAC component 104 via a particular wireless communication protocol used by that HVAC component 104. In other words, the traffic controller 162 may function as an intermediate interface that enables the control unit 180 of the climate management system 118 to receive and analyze sensor feedback from sensors 122 that utilize various different wireless communication protocols and/or to output control instructions to HVAC components 104 (e.g., the dampers 116) via various different wireless communication protocols.

In some embodiments, the climate management system 118 may be communicatively coupled (e.g., via one or more wired connections, such as a bi-directional RS-485 connection) to additional HVAC equipment 190 via an additional communication channel 192. As a non-limiting example, the additional HVAC equipment 190 may include an outdoor unit (e.g., in embodiments where the HVAC system 100 is the residential heating and cooling system 50), a ventilator, and/or other suitable HVAC equipment. The control unit 180 of the climate management system 118 may be configured to control or otherwise adjust operation of the additional HVAC equipment 190 via feedback received from the traffic controller 162, for example.

In the illustrated embodiment, the control system 102 includes a remote server 200 (e.g., one or more remote servers) that may be communicatively coupled to the traffic controller 162 via a network 202 (e.g., a wireless network, a wireless router in the building 106) and a cloud 204 (e.g., a network interface for accessing one or more remote servers, virtual machines, etc., for storage, computing, or other functionality). As discussed in detail herein, the network 202 and the cloud 204, collectively referred to herein as a cloud network 206 or a cloud computing environment, enable a user to monitor and/or control certain operations of the HVAC system 100 and/or to provide functional upgrades (e.g., software upgrades) to components of the HVAC system 100 remotely, without physically traveling to a location of the HVAC system 100, for example. That is, the network 206 may enable distribution of functional and configurational updates over the air (OTA).

For clarity, as used herein, discussions relating to processing data, storing data, transmitting data, generating control outputs (e.g., control signals), or performing other operations in and/or using the cloud network 206 or by a cloud computing environment are intended to denote computational operations that may be performed by the remote server 200 configured to provide the cloud-based computational environment and/or by an electronic device 210 (e.g., a smart phone, a laptop, a tablet) that provides a user of the HVAC system 100 with access to the cloud network 206. That is, as used herein, computational operations discussed as being performed "in the cloud" or by a "cloud computing environment" may refer to computational operations that are performed partially or completely by processing components that are located remotely from the HVAC system 100. The remote server 200 may include communication circuitry 212, processing circuitry 214, and one or more memory devices 216 that may cooperate to provide the cloud network 206.

In some embodiments, the electronic device 210 may be communicatively coupled to the traffic controller 162 via the cloud network 206. The electronic device 210 is configured to provide control instructions to and to receive feedback or data from the traffic controller 162. The traffic controller 162 may be configured to push some of or all of the feedback or data from the sensors 122 and/or other HVAC components 104 to the cloud network 206 to enable the user to monitor such feedback and/or data (e.g., in real-time). For example, the electronic device 210 may be configured to generate a user interface 218 (e.g., a graphical user interface) that enables the user to view current temperature values within each of the zones 114 (e.g., based on feedback received from the temperature sensors 130), current humidity levels within each of the zones 114 (e.g., based on feedback from the humidity sensors 132), and/or current occupancy within each of the zones 114 (e.g., based on feedback from the occupancy sensors 134). Additionally or alternatively, traffic controller 162 may push data relating to operational parameters of any other suitable components (e.g., components of the climate management system 118, the additional HVAC equipment 190, components of the vapor compression system 72) of the HVAC system 100 to the cloud network 206, such that the user my utilize the electronic device 210 to view such operational parameters, data, and so forth.

In some embodiments, the electronic device 210 may enable the user to designate target set-points for the environmental parameters (e.g., temperature, humidity), also referred to herein as operational parameters, within any one or combination of the zones 114. For example, the user interface 218 of the electronic device 210 may enable the user to designate a first target temperature set-point for the temperature within the first zone 108, a second target temperature set-point for the temperature within the second zone 110, and so forth. The traffic controller 162 may utilize data (e.g., received from the electronic device 210) indicative of the target set-points of the environmental parameters to control operation of the HVAC system 100 in a manner that causes the environmental parameters within the zones 114 to approach or reach the corresponding target set-point values designated by the user via input provided to the electronic device 210. For example, the traffic controller 162 may generate or enable generation of control instructions to adjust operation of the climate management system 118, the dampers 116, the additional HVAC equipment 116, and so forth, based on the data received from the electronic device 210.

For example, in some embodiments, the traffic controller 162 may receive (e.g., from the electronic device 210) an indication of the target temperature set-point for the first zone 108 and may compare the received target temperature set-point for the first zone 108 to a current temperature value within the first zone 108 (e.g., based on feedback received from the first temperature sensor 136). In response to determining that the current temperature within the first zone 108 deviates from the target temperature set-point for the first zone 108 (e.g., by a threshold amount), the traffic controller 162 may send instructions to the climate management system 118 to provide a supply of cooled air or heated air to the first zone 108, may instruct the damper 116 associated with the first zone 108 to increase or decrease a flow rate of conditioned air to the first zone 108, or may perform another suitable control action (e.g., to adjust operation of the HVAC system 100). In some embodiments, the traffic controller 162 may transmit the target temperature set-point for the first zone 108 (e.g., as received from the electronic device 210) and feedback indicative of the current temperature of the first zone 108 (e.g., as received from the first temperature sensor 136) to the control unit 180 of the climate management system 118, such that the control unit 180 (instead of the processing circuitry 172 of the traffic controller 162) may compare the target temperature set-point for the first zone 108 to the current temperature within the first zone 108 and determine whether to generate a control output (e.g., control instructions, a control signal) to adjust operation of the HVAC system 100 in accordance with the aforementioned techniques. The control unit 180 may transmit a generated control output (e.g., instructions to adjust operation of one or more HVAC components 104) to the traffic controller 162, and the traffic controller 162 may proceed to relay the control output to the corresponding HVAC component(s) 104 using the wireless communication protocol(s) utilized by the HVAC component(s) 104. It should be appreciated that the control system 102 may execute the aforementioned methodology to enable monitoring and/or adjustment of any suitable environmental parameter within individual zones 114 or a combination of the zones 114, as well as to monitor and/or adjust operational parameters of other HVAC components 104 (e.g., fans, blowers, lovers, valves, etc.).

In some embodiments, the electronic device 210 may enable the user to input a common set-point value for an environmental parameter across a group of the zones 114 and/or all of the zones 114 (e.g., such as when individual rooms or spaces of the building 106 are grouped into a common, single zone). In such embodiments, the traffic controller 162 may average feedback or data (e.g., as received from the sensors 122) indicative of the environmental parameters within multiple zones 114 and subsequently compare the average value of the environmental parameters to the common set-point value for the common zone. As an example, in certain embodiments, the user may configure the HVAC system 100 (e.g., via input provided on the electronic device 210) such that the rooms or spaces corresponding to the first, second, and third zones 108, 110, 112 are grouped into a common zone 230. The electronic device 210 may enable the user to input, for example, a common set-point value for the common zone 230. The traffic controller 162 may receive feedback and/or data (e.g., wirelessly) from the first temperature sensor 136, the second temperature sensor 138, and the third temperature sensor 140 indicative of corresponding temperatures in different areas or rooms of the building 106. The traffic controller 162 may calculate an average temperature of the common zone 230, which may be indicative of an average value of the individual temperature values provided by the temperature sensors 130. The traffic controller 162 may compare the average temperature of the common zone 230 to the common set-point temperature for the common zone 230 to determine whether to adjust operation of the HVAC system 100 in accordance with the aforementioned techniques. Additionally or alternatively, the traffic controller 162 may provide the average temperature to the control unit 180, and the control unit 180 may generate instructions (e.g., control outputs, control signals) for operating the HVAC system 100 based on a difference between the average temperature of the common zone 230 and the common set-point temperature for the common zone 230 and/or based on other analysis of the data provided by the traffic controller 162.

In some embodiments, the electronic device 210 may enable the user to input (e.g., via the user interface 218) an operational schedule for the HVAC system 100. For example, the operational schedule may dictate corresponding target set-points for certain environmental parameters of the zones 114 throughout certain hours of a day, during certain months or seasons of a year, and so forth. In certain embodiments, the operational schedule may include instructions for operating window blinds (e.g., motorized louvers), one or more fans or blowers, and/or one or more lights (e.g., controllable lighting fixtures), which may be includes a part of the HVAC components 104, based on certain parameters, such as hours of the day, an occupancy within certain of the zones 114, or other suitable criteria. In any case, the traffic controller 162 may receive the operational schedule via the cloud network 206 and may effectuate control of the HVAC system 100 in accordance with the operational schedule. The operational schedule may be stored on the memory device 174, the memory device 184 of the control unit 180, the cloud network 206, or another suitable memory device of the HVAC system 100.

In some embodiments, in response to detecting abnormal operation of a component (e.g., one or more of HVAC components 104, the climate management system 118, a component of the vapor compression system 72, a component of the additional HVAC equipment 190) of the HVAC system 100, the traffic controller 162, the control unit 180, and/or another suitable controller of the HVAC system 100 may determine occurrence of a fault condition of the HVAC system 100. The traffic controller 162 may transmit an indication of the fault condition (e.g., determined by the traffic controller 162 or received by the traffic controller 162) to the cloud network 206. In this way, the user may view (e.g., remotely view) the fault indication via the electronic device 210 communicatively coupled to the cloud network 206. For example, in response to detecting and/or receiving an indication of a fault condition, the traffic controller 162 may generate and transmit (e.g., via the cloud network 206) an alert message to the electronic device 210 indicating occurrence of the fault condition. In some embodiments, the traffic controller 162 may instruct the electronic device 210 to request a user input via the user interface 218 in response to transmission of the alert message to the electronic device 210. As an example, the traffic controller 162 may request that the user input or communicate (e.g., via the user interface 218) an acknowledgement that the fault condition has been received and viewed by the user.

In some embodiments, the electronic device 210 may enable the user to grant a service provider 240 with access to the cloud network 206. For example, in response to user input received via the user interface 218, the electronic device 210 may instruct the remote server 200 to allow an electronic device 242 (e.g., a laptop) of the service provider 240 to wirelessly communicate with the control system 102 via the cloud network 206. In this manner, the traffic controller 162, for example, may provide the service provider 240 with feedback or data indicative of any of the aforementioned operational parameters of the HVAC system 100 and/or fault conditions of the HVAC system 100. As such, the service provider 240 may send control inputs and/or other data to the traffic controller 162 to adjust operation of the HVAC system 100 and/or to remediate fault conditions that may be present in the HVAC system 100.

The user may temporarily or permanently grant the service provider 240 with access to the cloud network 206. For example, the user may temporarily allow (e.g., via input at the user interface 218) access by the service provider 240 in response to receiving an indication from the traffic controller 162 that a fault condition exists in the HVAC system 100. As such, the service provider 240 may take steps to remediate the fault condition on the HVAC system 100 (e.g., remote inputs provided on the electronic device 242). Upon resolution or other acknowledgement of the fault condition (e.g., by the service provider 240), the user may utilize the user interface 218 to revoke access of the service provider 240 to the control system 102 (e.g., through the cloud network 206).

In some embodiments, the control system 102 may enable the service provider 240 to remotely push or implement software updates to certain components of the HVAC system 100 without physically traveling to a location of the components. For example, upon availability of software updates for certain of the HVAC components 104, the service provider 240 may push (e.g., send) such software updates to the traffic controller 162 via the cloud network 206. The traffic controller 162 may modify or tailor the software updates for communication to the particular HVAC component 104 using (e.g., applying) the communication protocol (e.g., wireless communication protocol) utilized by that particular HVAC component 104. For example, in response to receiving software updates from the service provider 240 for the temperature sensors 130 and the humidity sensors 132, and determining that the temperature sensors 130 utilize a first type of wireless communication protocol and the humidity sensors 132 utilize a second (e.g., different) type of wireless communication protocol, the traffic controller 162 may send an appropriate software update for the temperature sensors 130 to the temperature sensors 130 using the first type of wireless communication protocol and may send an appropriate software update for the humidity sensors 132 to the humidity sensors 132 using the second type of wireless communication protocol. As such, the control system 102 may enable quick and easy installation of software updates to various components of the HVAC system 100 that may be communicatively (e.g., wirelessly) linked to the traffic controller 162 using different types of wireless communication protocols. It should be appreciated that the techniques described herein may be similarly utilized to enable implementation of corresponding software updates for any of the HVAC system components 104, additional HVAC equipment 190, climate management system 118 components, thermostats, zone controllers, zone control panels, HVAC unit control boards, variable speed drive (VSD) controllers, and so forth, described herein that may be configured to communicate with the traffic controller 162 using any of a variety of different types of wireless communication protocols.

In some embodiments, certain of the sensors 122 may be housed in a common housing to form multi-sensor system. For example, in the illustrated embodiment of FIG. the third temperature sensor 140 of the third zone 112, the third humidity sensor 146 of the third zone 112, and the third occupancy sensor 154 of the third zone 112 may be disposed within a housing 250 to form a multi-sensor system 252. The multi-sensor system 252 may include a common communication component 254 (e.g., an embodiment of the sensor communication circuitry 160) that enables each of the sensors 122 included in the multi-sensor system 252 to communicate with the traffic controller 162 in accordance with the aforementioned techniques. The multi-sensor system 252 and/or the individual sensors 122 therein may each include a power source (e.g., a battery) that is configured to supply electrical power for operation of the sensors 122 and/or the multi-sensor system 252. Therefore, the sensors 122 and/or the multi-sensor system 252 may not be coupled to an external power supply (e.g., via wired connections), and as a result the sensors 122 and the multi-sensor system 252 may be readily installed, uninstalled, repositioned, and/or relocated to different areas or regions within the zones 114 and/or the building 106. That is, the multi-sensor system 252 may be adjustably implemented within the HVAC system 100 without configuring and/or reconfiguring wired connections (e.g., power connections, communication connections) between the sensors 122 and/or the multi-sensor system 252 and other components of the HVAC system 100 (e.g., the traffic controller 162, a power source, etc.). In some embodiments, such flexibility of sensor arrangement may facilitate converting (e.g., retro-fitting) a non-zoned HVAC system to include components that facilitate operation of the HVAC system as a zoned HVAC system.

Figure 6:
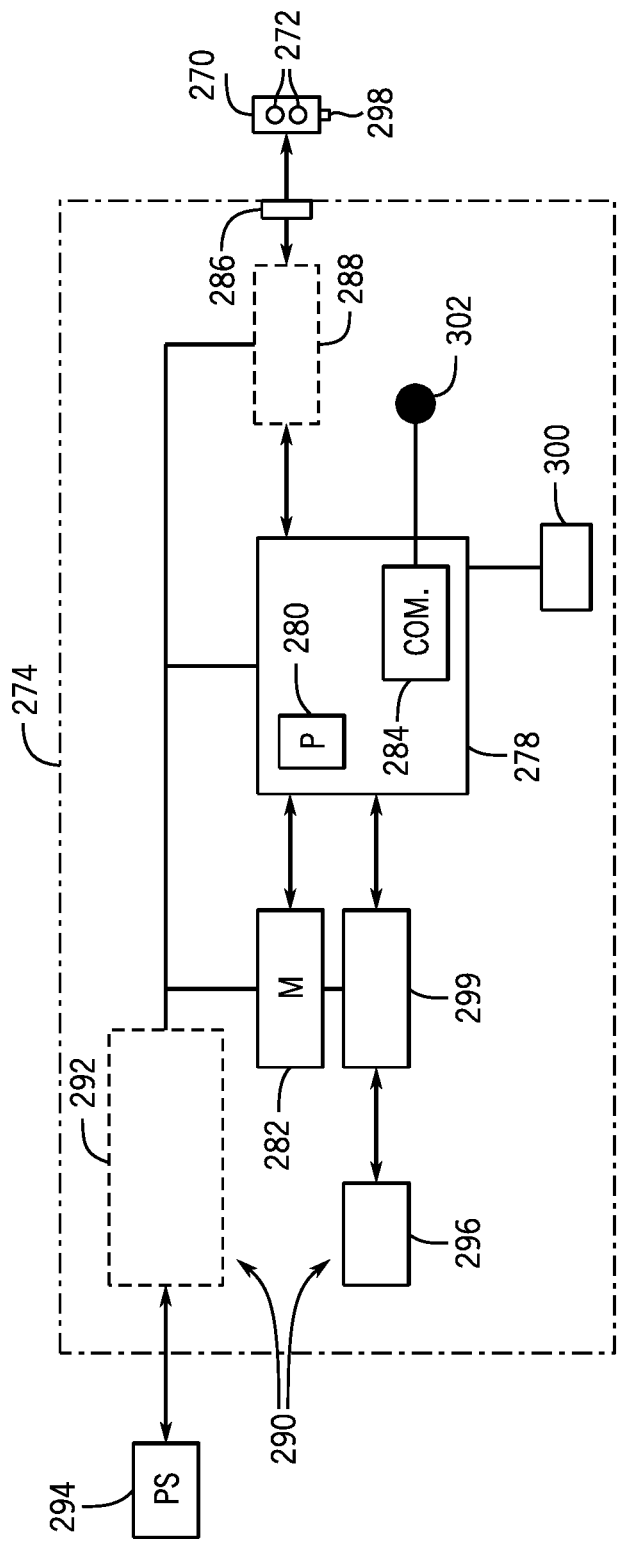
FIG. 6 is a schematic diagram of an embodiment of a dongle assembly of a control system for an HVAC system, in accordance with an aspect of the present disclosure.

Referring now to FIG. 6, a schematic diagram of various components that may be utilized with the HVAC system 100 and the control system 102 to provide improved communications (e.g., wireless communications) within the HVAC system 100 is illustrated. In some embodiments, certain HVAC components 104, referred to herein as base components 270, may include internal or integrated control circuitry 272 that lacks wireless communication functionality. That is, the integrated control circuitry 272 may lack hardware components, software components, and/or other features that enable wireless communication with other components. For example, the integrated control circuitry 272 may not be configured to enable wireless communication with control circuitry of the traffic controller 162 and/or the remote server 200. Traditionally, to provide wireless communication functionality, the base components 270 having integrated control circuitry 272 without wireless communication functionality are removed (e.g., uninstalled) and replaced with alternative, replacement components that may have wireless communication functionality. However, the uninstallation and replacement of such base components 270 is complicated, costly, and time-consuming, particularly for existing HVAC systems that are already installed.

Therefore, in accordance with present techniques, the control system 102 may include a dongle assembly 274, or a plurality of dongle assemblies 274, that may be coupled (e.g., communicatively coupled) to the base components 270 and are configured to provide wireless communication functionality to the base components 270. In other words, the dongle assembly 274 may be retrofitted with existing HVAC systems 100 and one or more base components 270 to enable wireless communication between respective control circuitries 272 of the base components 270 and between the base components 270 and other components or systems, such as the traffic controller 162 or another suitable controller of the HVAC system 100.

The dongle assembly 274 includes a dongle controller 278 having a processing circuitry 280 (e.g., one or more processors) and a memory device 282 (e.g., one or more memory devices). The processing circuitry 280 may include microprocessors, which may execute software configured to enable operation of the dongle assembly 274 in accordance with the present techniques. The processing circuitry 280 may include multiple microprocessors, one or more "general-purpose" microprocessors, one or more special-purpose microprocessors, and/or one or more application specific integrated circuits (ASICS), or some combination thereof. For example, the processing circuitry 280 may include one or more reduced instruction set (RISC) processors. The memory device 282 may include volatile memory, such as random access memory (RAM), and/or nonvolatile memory, such as read-only memory (ROM). The memory device 282 may store information, such as control software (e.g., compressor control algorithms or schemes), look up tables, configuration data, communication protocols, etc.

For example, the memory device 282 may store processor-executable instructions including firmware or software for the processing circuitry 280 execute, such as instructions to enable the dongle assembly 274 to provide suitable wireless communication functionality to the base components 270, as discussed below. In some embodiments, the memory device 282 is a tangible, non-transitory, machine-readable media that may store machine-readable instructions for the processing circuitry 280 to execute. The memory device 282 may include ROM, flash memory, hard drives, any other suitable optical, magnetic, or solid-state storage media, or a combination thereof. The dongle assembly 274 includes a dongle communication interface 284 (e.g., communication circuitry, wireless communication circuitry) that enables the processing circuitry 280 to communicate with the traffic controller 162, the remote server 200, the HVAC components 104, and/or other components of the HVAC system 100 that may utilize different wireless communication protocols.

The dongle assembly 274 include a port 286 that enables the dongle assembly 274 to communicatively couple (e.g., via a wired communication channel 288) to the control circuitry 272 of a corresponding base component 270. For example, the port 286 may enable communicative coupling of the processing circuitry 280 with the control circuitry 272 via an RS-485 connection or another suitable wired connection. In any case, the wired communication channel 288 may enable the exchange of data, control signals, and/or electrical power between the base component 270 and the dongle assembly 274. As discussed below, in some embodiments, the port 286 may enable the dongle assembly 274 to communicatively couple (e.g., via one or more wired connections) to 1, 2, 3, 4, 5, 6, or more than six base components 270 to provide wireless communication functionality to each of the base components 270. That is, an individual dongle assembly 274 may provide wireless communication functionality to multiple control circuitries 272 of corresponding base components 270.

In some embodiments, the dongle assembly 274 may include one or more power ports 290 (e.g., power port assembly, power port system, power port arrangement, plurality of power ports) that enables the dongle assembly 274 to electrically couple to an external power source. Thus, the power port 290 may provide the dongle assembly 274 with electrical power to enable operation of the dongle assembly 274. For example, the power port 290 may include a first power plug 292 (e.g., receptacle, connector) that enables the dongle assembly 274 to electrically coupled to and receive electrical power from a power supply 294 (e.g., an alternating current [A/C] power supply, a direct current [DC] power supply). Additionally or alternatively, the power port 290 may include a second power plug 296 (e.g., a USB plug, receptacle, connector) that is different than the first power plug 292, and which may be electrically coupled to power supply 294 or to another power supply. For example, in some embodiments, the second power plug 296 may be configured to engage with a port 298 of the base component 270 and enable the dongle assembly 274 to receive electrical power from the base component 270. The second power plug 296 may be coupled to the dongle controller 278 via a Future Technology Devices International Limited (FTDI) interface 299. It should be understood that providing multiple power ports 290 may improve an installation flexibility of the dongle assembly 274 by enabling the dongle assembly 274 to receive electrical power from a variety of power supplies 294 and/or base components 270 that may be configured to output electrical power via different types of connection ports (e.g., physical socket assemblies). In other embodiments, the dongle assembly 274 may include an internal power supply 300 (e.g., a battery) that is disposed within a housing of the dongle assembly 274 and is configured to provide the components of the dongle assembly 274 with electrical power in addition to, or in lieu of, the power port 290.

In any case, upon communicative coupling (e.g., via the wired communication channel 288) of the dongle assembly 274 to the base component 270, the dongle communication interface 284 may provide wireless communication functionality for the base component 270. In other words, data, feedback, control signals, and/or other information may be wireless communicated to and from the base component 270 via the dongle assembly 274. For example, the dongle assembly 274 may enable the integrated control circuitry 272 to receive data and control instructions from and/or to transmit data and control instructions to an external controller (e.g., the traffic controller 162, the remote server 200) using a desired wireless communication protocol (e.g., Wi-Fi, mobile telecommunications technology, Bluetooth®, Zigbee®, Matter, near-field communications technology). That is, the dongle communication interface 284 may be configured to enable wireless communications using a particular type or multiple types of wireless communication protocols based on the type or types of wireless communication protocols implemented by the external controller or controllers with which the dongle communication interface 284 is wirelessly linked. In some embodiments, the dongle communication interface 284 may include an antenna 302 that enables the dongle communication interface 284 to wirelessly communicate via any one or combination of the aforementioned wireless communication protocols. The dongle communication interface 284 may be configured to wirelessly communicate with the traffic controller 162 and/or to exchange data with the cloud network 206 (e.g., via communication with the network 202 and/or the remote server 200).

Figure 7:
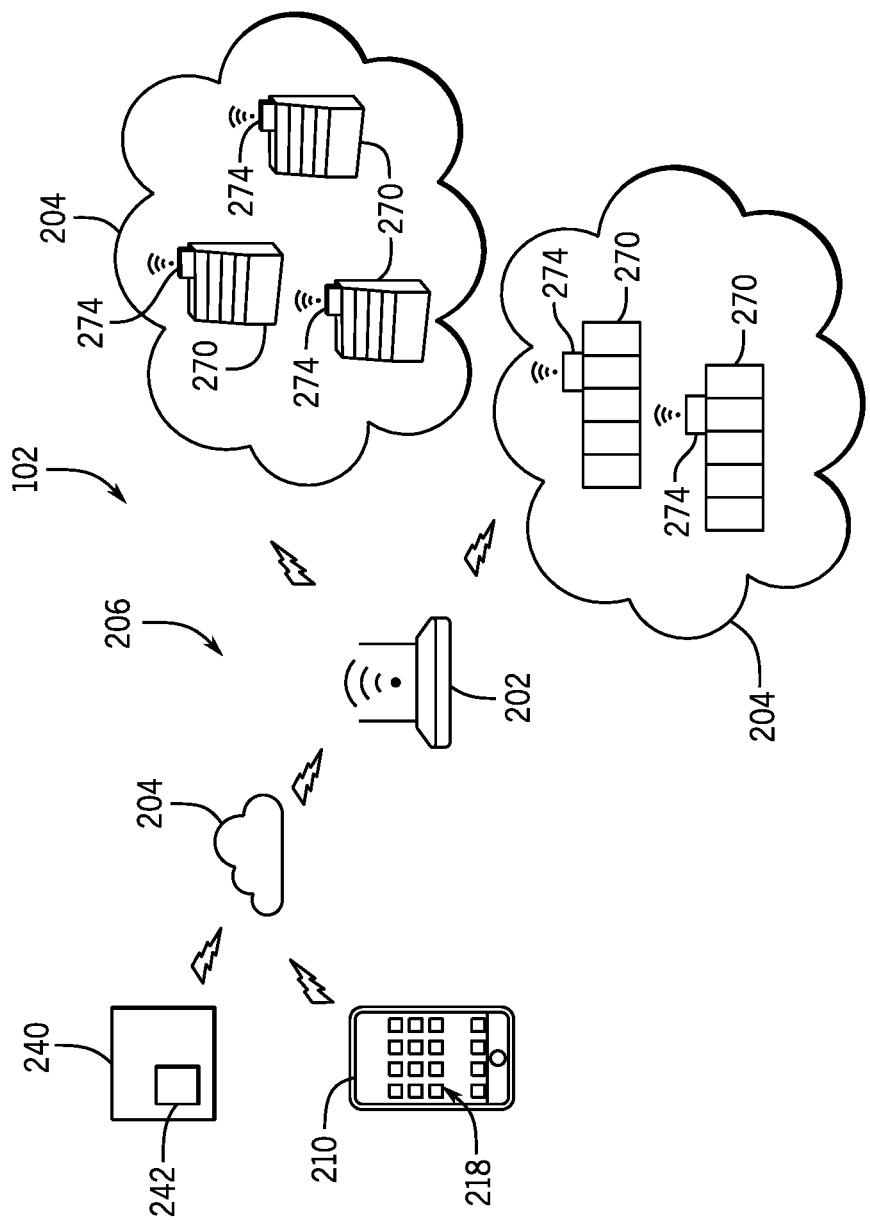
FIG. 7 is a schematic diagram of an embodiment of a portion of an HVAC system having a control system configured to enable wireless operation of HVAC components, in accordance with an aspect of the present disclosure.

FIG. 7 is a schematic of an embodiment of a portion of the control system 102, illustrating a plurality of dongle assemblies 274 coupled to corresponding base components 270. In the illustrated embodiment, each of the dongle assemblies 274 is coupled to a particular base component 270. However, as discussed above, each of the dongle assemblies 274 may be configured to couple to and to provide wireless functionality to multiple base components 270. It should be appreciated that the base components 270 may include any suitable HVAC component 104 or equipment for which retro-fitting of wireless functionality is desired. For example, the base components 270 may include refrigeration cabinets (e.g., food storage displays), compressor systems, expansion valves, variable speed drives, cooling towers, sensors, fans, thermostats, zone controllers, zone control panels, or other suitable HVAC components 104 configured to provide and/or receive data, control signals, and/or other information.

In some embodiments, the dongle assemblies 274 may be communicatively coupled (e.g., wireless coupled) to the cloud network 206 via the network 202. That is, the dongle assemblies 274 may communicate (e.g., communicate via the network 202) with the cloud network 206 without communicating with or through the traffic controller 162. As such, the traffic controller 162 may be omitted from certain embodiments of the control system 102. The dongle assemblies 274 may push (e.g., send) data indicative of operational parameters of the base components 270 and/or of fault conditions of the base components 270 to the cloud network 202 in accordance with the techniques discussed above. In this way, the user (e.g., via the electronic device 210) and/or the service provider 240 (e.g., via the electronic device 242) may receive and view the data.

Moreover, the dongle assemblies 274 may enable the user and/or the service provider 240 to push (e.g., send) software updates to the dongle assemblies 274 in accordance with the techniques described herein. Accordingly, the dongle assemblies 274 may transmit the software updates to the control circuitries 272 of the base components 270 for installation and/or execution. Indeed, it should be understood that the user (e.g., via the electronic device 210) and/or the service provider 240 (e.g., via the electronic device 242) may communicate with one or more of the dongle assemblies 274 in addition to, or in lieu of, the traffic controller 162, to monitor, adjust, and/or control operation of the control system 102 in accordance with the techniques described herein. That is, the control system 102 enables the user and/or the service provider 240 to wirelessly communicate with the control circuitries 272 (e.g., via the dongle assemblies 274) to view operational data of the base components 270, to view and/or remediate fault conditions that may be present with the base components 270, to initiate, block, or otherwise adjust operation of the base components 270, to set operational schedules for the base components 270, to push software updates from the cloud network 206 to the base components 270, and/or to perform other suitable actions.

FIG. 8 is a perspective view of an embodiment of the dongle assembly 274. The dongle assembly 274 includes an enclosure 330 that is configured to house certain components of the dongle assembly 274, such as the dongle controller 278. The dongle assembly 274 includes a set of terminals 332 that enable the dongle assembly 274 to couple (e.g., via wired connections) to one or more base components 270 and/or to a power source (e.g., the power supply 294) in accordance with the techniques discussed above. The enclosure 330 may include one or more mounting flanges 334 that facilitate coupling of the dongle assembly 274 to a suitable support structure (e.g., a portion of the base component 270). For example, the mounting flanges 334 may include apertures 336 formed therein that enable fasteners 338 to removeably couple the dongle assembly 274 to another structure. In this way, the mounting flanges 334 may facilitate installation of the dongle assembly 274 to a base component 270 or other adjacent structure (e.g., when the dongle assembly 274 is retro-fitted with the base component 270 to provide wireless functionality to the base component 270).

As set forth above, embodiments of the present disclosure may provide one or more technical effects useful for providing a wireless communication and control architecture to monitor and/or control components of an HVAC system. The wireless control architecture may reduce costs and/or overall complexity that may be involved in installation, operation, and/or maintenance of the HVAC system. Embodiments of the present disclosure may also provide one or more technical effects useful for providing wireless communication functionality to components that lack integrated wireless communication circuitry. It should be understood that the technical effects and technical problems in the specification are examples and are not limiting. Indeed, it should be noted that the embodiments described in the specification may have other technical effects and can solve other technical problems.

While only certain features and embodiments have been illustrated and described, many modifications and changes may occur to those skilled in the art, such as variations in sizes, dimensions, structures, shapes and proportions of the various elements, values of parameters, such as temperatures and pressures, mounting arrangements, use of materials, colors, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure.

Furthermore, in an effort to provide a concise description of the exemplary embodiments, all features of an actual implementation may not have been described, such as those unrelated to the presently contemplated best mode, or those unrelated to enablement. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A control system of a heating, ventilation, and/or air conditioning (HVAC) system, comprising:
a data communication controller configured to:
    receive, via a first wireless communication protocol, data from a sensor indicative of an operational parameter of the HVAC system;
    receive, via an electronic device communicatively coupled to the data communication controller, a control instruction;
    determine a second wireless communication protocol, different from the first wireless communication protocol, utilized by an HVAC component configured to receive wireless communications from the data communication controller and configured to enable supply of conditioned air to a conditioned space serviced by the HVAC system; and
    transmit, via the second wireless communication protocol, a control signal to adjust operation of the HVAC component based on the data and the control instruction.

2. The control system of claim 1, comprising the electronic device, wherein the electronic device is configured to receive a user input indicative of the control instruction, and wherein the control instruction comprises a target set-point for the operational parameter.

3. The control system of claim 1, wherein, in response to receiving, from an additional electronic device communicatively coupled to the data communication controller, software updates for the sensor, the data communication controller is configured to transmit the software updates to the sensor via the first wireless communication protocol.

4. The control system of claim 3, wherein, in response to receiving, from the additional electronic device wirelessly communicatively coupled to the data communication controller, additional software updates for the HVAC component, the data communication controller is configured to transmit the additional software updates to the HVAC component via the second wireless communication protocol.

5. The control system of claim 1, comprising a remote server configured to establish a cloud network, wherein the data communication controller is communicatively coupled to the electronic device via the cloud network.

6. The control system of claim 5, wherein the data communication controller is configured to send, via the cloud network, an indication of an occurrence of a fault condition in the HVAC system to the electronic device.

7. The control system of claim 1, wherein the data communication controller is configured to:
    receive, via a third wireless communication protocol, additional data from an additional sensor indicative of the operational parameter of the HVAC system;
    determine an average value of the operational parameter based on the data and the additional data; and
    transmit the control signal to adjust the HVAC component based on the average value and the control instruction.

8. The control system of claim 7, wherein at least two of the first wireless communication protocol, the second wireless communication protocol, and the third wireless communication protocol are different types of wireless communication protocols.

9. The control system of claim 1, wherein the HVAC component comprises a damper.

10. The control system of claim 1, comprising a climate management system communicatively coupled to the data communication controller, wherein the climate management system comprises a control unit configured to receive the data and the control instruction and to generate the control signal based on the data and the control instruction.

11. The control system of claim 10, wherein the control unit is configured to modify operation of the climate management system to adjust a parameter of the conditioned air based on the data and the control instruction.

12. A control system of a heating, ventilation, and/or air conditioning (HVAC) system, comprising:
a remote server configured to establish a cloud computing environment;
a data communication controller communicatively coupled to an electronic device via the cloud computing environment, wherein the data communication controller is configured to:
receive a control instruction from the electronic device;
receive, via a first wireless communication protocol, data from a first sensor indicative of a first operational parameter of the HVAC system; and
receive, via a second wireless communication protocol, additional data from a second sensor indicative of a second operational parameter of the HVAC system; and
a climate management system comprising a control unit configured to receive the control instruction, the data, and the additional data from the data communication controller, wherein the control unit is configured to generate a control signal to adjust operation of an HVAC component based on the control instruction, the data, and the additional data,
wherein the data communication controller is further configured to:
receive the control signal from the control unit;
determine a particular wireless communication protocol utilized by the HVAC component; and
convert the control signal for wireless transmission to the HVAC component via the particular wireless communication protocol.

13. The control system of claim 12, wherein the control unit is configured to modify operation of the climate management system to adjust a parameter of a conditioned air flow generated by the climate management system based on the control instruction, the data, and the additional data, and the control signal is configured to cause the HVAC component to adjust output of the conditioned air flow to a space serviced by the HVAC system.

14. The control system of claim 12, wherein the data communication controller is configured to:
receive, from the cloud computing environment, a software update for the HVAC component of the HVAC system; and
transmit the software update to the HVAC component via the particular wireless communication protocol.

15. The control system of claim 12, wherein at least two of the first wireless communication protocol, the second wireless communication protocol, and the particular wireless communication protocol are different types of wireless communication protocols.

16. The control system of claim 12, wherein the data communication controller is communicatively coupled to the control unit via a wired connection.

17. A control system for a heating, ventilation, and/or air conditioning (HVAC) system, comprising:
a data communication controller configured to receive sensor data from one or more sensors indicative of an operational parameter of the HVAC system and to output control instructions to one or more HVAC components using a plurality of different wireless communication protocols; and
a control unit of a climate management system, wherein the control unit is configured to receive the sensor data from the data communication controller, generate the control instructions based on the sensor data, and transmit the control instructions to the data communication controller for transmission to the one or more HVAC components,
wherein the data communication controller is further configured to:
determine a particular wireless communication protocol of the plurality of different wireless communication protocols based on a type of an HVAC component of the one or more HVAC components;
convert a format of the control instructions based on the particular wireless communication protocol; and
transmit the control instructions to the HVAC component of the one or more HVAC components via the particular wireless communication protocol.

18. The control system of claim 17, comprising an electronic device communicatively coupled to the data communication controller and configured to provide an indication of a target set-point for the operational parameter, wherein the control unit is configured to receive the indication of the target set-point from the data communication controller and to generate the control instructions based on the sensor data and the target set-point.

19. The control system of claim 17, wherein the plurality of different wireless communication protocols comprises Wi-Fi, mobile telecommunications technology, Bluetooth®, Zigbee®, Matter, near-field communications technology, or a combination thereof.

20. The control system of claim 17, comprising a dongle assembly configured to wirelessly communicate with the data communication controller and provide wireless functionality to a base component of the HVAC system.

* * * * *